United States Patent
Dhagare et al.

(10) Patent No.: US 12,094,335 B2
(45) Date of Patent: Sep. 17, 2024

(54) ADAPTIVE SOUND GENERATION

(71) Applicant: INTERNATIONAL BUSINESS MACHINES CORPORATION, Armonk, NY (US)

(72) Inventors: Rajesh Prabhakar Dhagare, Osmanabad (IN); Venkata Vara Prasad Karri, Visakhapatnam (IN); Akash U. Dhoot, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 17/805,470

(22) Filed: Jun. 6, 2022

(65) Prior Publication Data
US 2023/0394966 A1    Dec. 7, 2023

(51) Int. Cl.
*G08G 1/0962*    (2006.01)
*G06F 3/16*    (2006.01)

(52) U.S. Cl.
CPC ......... *G08G 1/09626* (2013.01); *G06F 3/165* (2013.01)

(58) Field of Classification Search
CPC ............................ G08G 1/09626; G06F 3/165
See application file for complete search history.

(56) References Cited

U.S. PATENT DOCUMENTS

| | | | |
|---|---|---|---|
| 10,068,620 B1 * | 9/2018 | Lin | G01C 21/3629 |
| 10,207,638 B2 | 2/2019 | Herbert | |
| 10,582,288 B2 | 3/2020 | Kirsch | |
| 11,076,274 B1 * | 7/2021 | Buentello | G07C 5/0808 |
| 2015/0137998 A1 * | 5/2015 | Marti | H04K 3/45 340/901 |
| 2020/0031337 A1 | 1/2020 | Soltanian | |
| 2020/0135163 A1 * | 4/2020 | Lovitt | G10K 11/17827 |
| 2021/0197667 A1 * | 7/2021 | Winton | B60K 35/00 |
| 2021/0248983 A1 * | 8/2021 | Balassanian | G10H 1/0066 |

FOREIGN PATENT DOCUMENTS

DE    102014210932 A1    12/2015

OTHER PUBLICATIONS

Disclosed Anonymously, "Method and System for Providing Support to Vehicle Drivers in Densely Populated Areas," ip.com, IP.com No. IPCOM000227011D, IP.com, Publication Date: Apr. 30, 2013, 3 pages.
Mell et al., "The NIST Definition of Cloud Computing", National Institute of Standards and Technology, Special Publication 800-145, Sep. 2011, 7 pages.

* cited by examiner

*Primary Examiner* — Mohamed Barakat
(74) *Attorney, Agent, or Firm* — Michael O'Keefe (57) ABSTRACT

According to one embodiment, a method, computer system, and computer program product for converting traffic noises is provided. The embodiment may include capturing audio input relating to traffic conditions or environmental conditions surrounding a user or a vehicle containing a user. The embodiment may also identifying undesirable noises from within the captured audio. The embodiment may further include generating mood-improving sounds for a user based on the identified noises. The embodiment may also playing the generated sounds for the user. The embodiment may further include alerting the user or a second user of relevant traffic conditions or relevant environmental conditions including conditions that correspond to the identified noises.

11 Claims, 5 Drawing Sheets

ADAPTIVE SOUND GENERATION

BACKGROUND

The present invention relates generally to the field of computing, and more particularly to sonic user interface.

A sonic user interface is a type of user interface that sound to help humans and computing devices interact with one another. This includes both sound-based input and output. Audio output can provide users with information without occupying visual attention, and can have complex, beneficial effects on a user's mental and emotional state, including a user's mood, stress level, and general well-being.

SUMMARY

According to one embodiment, a method, computer system, and computer program product for converting traffic noises is provided. The embodiment may include capturing audio input relating to traffic conditions or environmental conditions surrounding a user or a vehicle containing a user. The embodiment may also identifying undesirable noises from within the captured audio. The embodiment may further include generating mood-improving sounds for a user based on the identified noises. The embodiment may also playing the generated sounds for the user. The embodiment may further include alerting the user or a second user of relevant traffic conditions or relevant environmental conditions including conditions that correspond to the identified noises.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to sonic user interface. The following described exemplary embodiments provide a system, method, and program product to, among other things, generate and play positive, relaxing sounds based on harmful, hazardous, or deleterious environmental noises. Therefore, the present embodiment has the capacity to improve the technical field of sonic user interface by generating soothing sounds based on undesirable noises.

As previously described, a sonic user interface is a type of user interface that sound to help humans and computing devices interact with one another. This includes both sound-based input and output. Audio output can provide users with information without occupying visual attention, and can have complex, beneficial effects on a user's mental and emotional state, including a user's mood, stress level, and general well-being.

Particularly, SUI may incorporate such techniques as audio generation, noise cancellation, relative volume adjustments and autonomous sensory meridian response (ASMR) to maintain or improve a user's mood or stress level, direct a user's attention, or provide a user with information efficiently. Such SUI techniques may work in concert with graphical user interface (GUI) design to provide users with large amounts of information quickly without overloading the user's senses, distracting the user from real-world surroundings, or causing additional stress. Furthermore, stress from noise pollution can have a significant negative impact on a person's well-being.

However, balancing SUI design with real-world auditory information poses risks to user safety. Traffic noises, such as car horns, other vehicular noises, or vocal utterances from drivers, passengers, and pedestrians, while stressful, may sometimes provide useful information to those in traffic. Merely cancelling such noises without providing the relevant information they represent to users may prove dangerous. As such, it may be important to identify relevant traffic noises and generate sounds that may prove beneficial to the user, while still ensuring that users are alerted to necessary and relevant information.

According to at least one embodiment, an SUI system may use audio input, visual input, and data taken from other sources, to identify undesirable traffic noises. Other sources may include the Internet, a local area network connection, a local edge server, or devices connected over the Internet of Things (IoT). The system may then use identified noises to generate sounds that may help improve users' mood while still reflecting the information in the identified noises. The system may play that audio for users, and may additionally find other methods for alerting users of relevant traffic conditions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for generating sounds that may improve a user's mood or well-being based on traffic noises.

Figure 1:
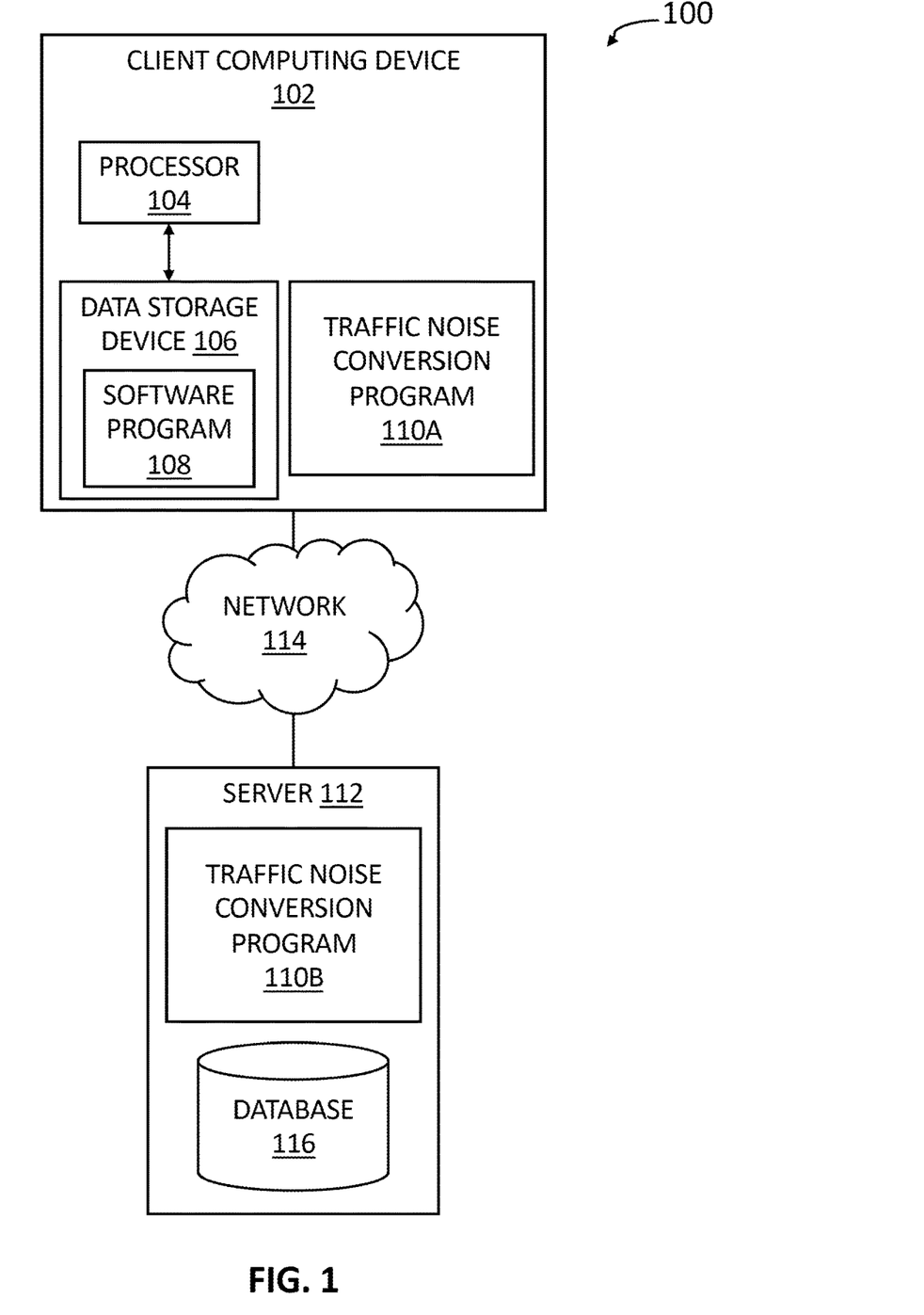
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, and a server 112, interconnected via a communication network 114. According to at least one implementation, the networked computer environment 100 may include a plurality of client computing devices 102 and servers 112 of which only one of each is shown for illustrative brevity. Additionally, in one or more embodiments, the client computing device 102 and server 112 may each individually host a t 110A, 110B. In one or more other embodiments, the adaptive sound generation program 110A, 110B may be partially hosted on both client computing device 102 and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an adaptive sound generation program 110A and communicate with the server 112 via the communication network 114, in accordance with one embodiment of the invention. There may be a visual sensor or an audio sensor embedded in or communicatively coupled with client computing device 102. In one or more other embodiments, client computing device 102 may be, for example, a vehicle, a mobile device, a telephone, a personal digital assistant, a netbook, a laptop computer, a tablet computer, or any type of computing device capable of running a program and accessing a network. As previously described, one client computing device 102 is depicted in FIG. 1 for illustrative purposes, however, any number of client computing devices 102 may be utilized. As will be discussed with reference to FIG. 3, the client computing device 102 may include internal components 302a and external components 304a, respectively.

The server computer 112 may be a vehicle, a laptop computer, netbook computer, personal computer (PC), a desktop computer, an IoT device hub, a web server, or any programmable electronic device or any network of programmable electronic devices capable of hosting and running an adaptive sound generation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the adaptive sound generation program 110A, 110B may be capable generating relaxing sounds that may improve users' mood based on undesirable traffic noises. In at least one embodiment, the adaptive sound generation program 110A, 110B captures audio input. The adaptive sound generation program 110A, 110B may then identify undesirable traffic noises from within that audio. The adaptive sound generation program 110A, 110B may further generate relaxing sounds based on identified noises. The adaptive sound generation program 110A, 110B may then play the generated audio. In at least one embodiment, the adaptive sound generation program 110A, 110B may alert a user of relevant traffic conditions. The method for adaptive sound generation is explained in further detail below with respect to FIG. 2.

Figure 2:
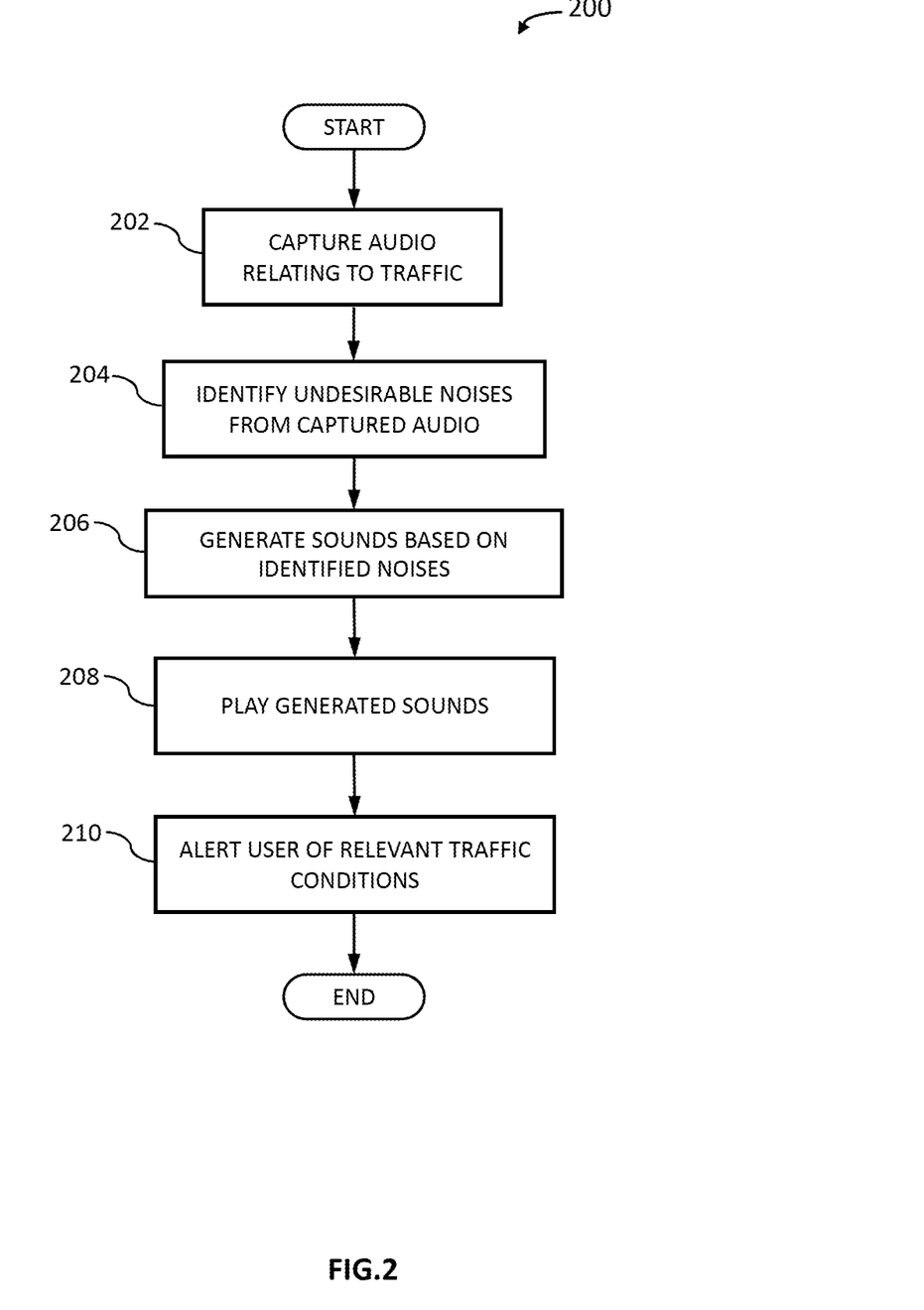
FIG. 2 illustrates an operational flowchart for a process for adaptive sound generation according to at least one embodiment.

Referring now to FIG. 2, an operational flowchart illustrating a process for adaptive sound generation 200 is depicted according to at least one embodiment. At 202, the adaptive sound generation program 110A, 110B captures audio input relating to traffic and environmental sounds. Capturing audio input may include recording audio using one or more audio sensors embedded in or communicatively coupled with computing device 102. An audio sensor may include, for example, a microphone embedded in a vehicle, a smartphone's microphone array, a microphone on a pair of headphones, or a dedicated peripheral microphone.

In at least one embodiment, the adaptive sound generation program 110A, 110B may capture additional input. Additional input may be captured using sensors embedded in or communicatively coupled with client computing device 102 or server computer 112. Alternatively, additional input may be captured from other devices over a network connection, such as an internet protocol, a local wireless network protocol, or Bluetooth® (Bluetooth and all Bluetooth-based trademarks and logos are trademarks or registered trademarks of the Bluetooth Special Interest Group and/or its affiliates). For example, an IoT-enabled city may enable the adaptive sound generation program 110A, 110B to capture data from traffic lights, street cameras, or municipal weather devices. Alternatively, adaptive sound generation program 110A, 110B may capture audio input collected by nearby vehicles that opt-in to sharing such data by an opt-in procedure.

Alternatively, additional information may be collected from known data sources, such as via an Application Programming Interface (API). For example, additional information may be collected from a map data API, a traffic data API, or a weather API. For example, a traffic data API or weather API may reveal that roads are very icy.

In a preferred embodiment, the adaptive sound generation program 110A, 110B may operate in a vehicle in traffic. A user inside a vehicle may be, for example, a passenger. In an alternate embodiment, the adaptive sound generation program 110A, 110B may operate in another context, such as a pedestrian walking near traffic wearing headphones, or an individual user sitting in front of a laptop and within earshot of undesirable traffic noises.

Then, at 204, the adaptive sound generation program 110A, 110B identifies undesirable traffic noises from the captured audio input. Identification may include determining that a portion of the captured audio is undesirable traffic noise. Identifying may also include determining a type or category of a particular sound. Determining a type or category may be performed by pattern recognition, sound processing based on artificial intelligence (AI), or other known methods.

In at least one embodiment, identifying may include a process of analyzing the captured audio input. Identifying may further involve a process of analyzing additional input to help determine which sounds are undesirable traffic noises. For example, if a traffic API indicates that there is a high degree of congestion around client computing device 102 and the captured audio contains frequent noises indicative of car horns, the adaptive sound generation program 110A, 110B may determine that the frequent noises are the car horns utilized to show driver frustration with the current traffic conditions rather than to indicate an emergency or dangerous situation, and are therefore undesirable background noise.

In at least one embodiment, the adaptive sound generation program 110A, 110B may determine that predetermined types of audio are undesirable traffic noise. For example, the adaptive sound generation program 110A, 110B may determine that all honking is undesirable traffic noise, or recognize the sound of particular loud mufflers and determine that those muffler sounds are undesirable traffic noise. Alternatively, the adaptive sound generation program 110A, 110B may determine that all sounds except human speech and emergency vehicle sirens are undesirable traffic noise.

In another embodiment, the adaptive sound generation program 110A, 110B may use a process of AI to determine which audio is undesirable traffic noise. For example, the adaptive sound generation program 110A, 110B may use a process of AI to determine the distance from which a sound is coming, and may determine that sounds coming from beyond a particular distance are more likely to be undesirable traffic noises. A process of AI may include usage of a neural network to categorize audio or determine which audio is or is not undesirable traffic noise.

In another embodiment, the adaptive sound generation program 110A, 110B may allow users to select particular types of noise as undesirable traffic noise. For example, a user may select all honks, muffler noises, thunder, high winds, and animal noises as undesirable traffic noise, or may mark human speech and the sound of light rain as desirable sound.

In an alternative embodiment, the adaptive sound generation program 110A, 110B may determine that all captured audio is undesirable traffic noise.

In a further embodiment, identification may include an assessment of risk for a given sound. Risk may include a likelihood of one or more harms and a degree of each associated harm. Alternatively, risk may include an overall weighted risk score. Risk may alternatively include general risk categories such as "high risk" and "low risk." Risk may be calculated using known methods, including predetermined associations based on category of sound, pattern matching with known risk factors, and AI risk analysis. For example, if a long honk sound is correlated with additional input indicating that a nearby car is skidding, the long honk sound may be considered a high-risk sound.

In at least one embodiment, the identifying may include a weighted, tiered, or other complex selection algorithm for determining whether individual sounds are undesirable traffic noise. For example, sounds that are considered distant may be weighted as more likely to be undesirable traffic noise; sounds that correlate with high-risk may be weighted as less likely to be undesirable traffic noise; sounds that appear to contain human speech may be subject to sentiment analysis whereby angry or vulgar speech may be weighted as more likely to be undesirable traffic noise, but other speech may be weighted much less likely to be undesirable background noise.

In at least one embodiment, identifying may involve predicting incoming sounds. For example, if the adaptive sound generation program 110A, 110B notes that a particular honking sound has been repeating every two seconds, the adaptive sound generation program 110A, 110B may predict that the honking sound may repeat two seconds after the most recent honking sound. Alternatively, identification may use captured video data displaying lightning to help predict the incoming sound of thunder. Alternatively, if captured audio includes an emergency vehicle siren, the adaptive sound generation program 110A, 110B may identify the position, or velocity of the siren by computing the frequency of the siren over time in light of the Doppler effect, and predict the pattern of the siren's sounds going forward.

In at least one embodiment, the adaptive sound generation program 110A, 110B may capture supplemental data that may assist in modeling visual cues at 204. Supplemental data may include data from non-visual motion sensors or tactile input. Non-visual motion sensors may include gyroscopic sensors present in smartphones or video game controllers. Tactile input may include touch screen input, keyboard input, trackpad input, or input from an electronic scale.

Identifying may further include using one or more of the above techniques in combination with other techniques. For example, predicting incoming sounds may be conducted by a process of AI.

Then, at 206, the adaptive sound generation program 110A, 110B generates agreeable sounds based on identified noises. Generating agreeable sounds may include determining or generating agreeable sounds that reflect a portion of the information present in the identified noises. Generated sounds may be agreeable to one or more users. A user may include, for example, a passenger, pedestrian, or other individual in or near traffic.

In at least one embodiment, agreeable sounds may be sounds that are intended to improve a user's mood, either while the sound is being played or in the long-term. For example, agreeable sounds may be relaxing, calming, energizing, or soothing. Alternatively, an agreeable sound may help a user stay awake or focused. An agreeable sound may further be intended to make a user happy or improve a user's productivity.

Alternatively, agreeable sounds may be sounds that are intended to improve a user's well-being, either while the sound is being played or in the long-term. For example, agreeable sounds may be sounds that reduce stress, reduce blood pressure, improve sleep quality, help a user learn, or improve irregular heartbeat. Agreeable sounds may involve a combination involving one or more of the above purposes or functions.

In a further embodiment, agreeable sounds may include music, animal sounds, nature sounds, or other sounds that may be thought to achieve the intended purpose. For example, agreeable sounds may include jazz music, whale sounds, bird sounds, the sounds of a forest, the sound of a crackling fire, the sound of a breeze, the sounds of children playing, or white noise.

In at least one embodiment, agreeable sounds may be generated based purely on the captured audio or identified noises. Alternatively, agreeable sounds may be based partly on existing sounds, such as existing music or existing animal sounds. Existing sounds may be predetermined, selected by a user, or selected by an algorithmic process from a selection of existing sounds. Such sounds may be selected from additional input. For example, pleasing sounds may be based on a playlist that is popular on a given music streaming service at the time they are generated, or based on music from a radio feed.

In at least one embodiment, generated sounds are generated to complement captured audio, so that the resulting combined audio achieves a desired effect. For example, if a portion of captured audio resembles music in a major key, generated sounds may also utilize a major key. Alternatively, generated sounds may include an echo effect of certain captured audio to highlight audio that correlates with risk factors, or reduce undesirable audio.

In at least one embodiment, generating sounds may include setting a relative volume level for a particular generated sound, or for all generated sounds. In a preferred embodiment, volume may be set so that generated sounds do not mask sounds associated with high level of risk.

In an alternate embodiment, agreeable sounds may be generated to fit particular techniques for improving a user's mood. For example, agreeable sounds may be generated to affect an ASMR or synesthetic response in a user.

Then, at 208, the adaptive sound generation program 110A, 110B plays the generated sounds. The adaptive sound generation program 110A, 110B may play generated sounds over a speaker embedded in or communicatively coupled with client computing device 102 or server 112; over a pair of headphones communicatively coupled with client computing device 102 or server 112; a peripheral speaker; or over a combination of devices capable of playing audio.

In at least one embodiment, the adaptive sound generation program 110A, 110B may determine the volume of sounds played. Alternatively, a user may determine the volume of sounds using user-accessible volume controls. As yet another alternative, a user may set a relative level of volume and the adaptive sound generation program 110A, 110B may determine a volume for each sound relative to the volume level selected by the user.

In another embodiment, playing generated sounds may include a process of noise cancellation. Noise cancellation may target specific sounds or may generically reduce all sounds captured, and may include noise reduction, active noise cancellation, muting, and other similar techniques.

In a further embodiment, noise cancellation may be a physical process. For example, a vehicle's frame may reduce sounds that come from outside the vehicle. Alternatively, a pair of headphones worn by a pedestrian or passenger may seal out sounds external from the headphones.

In yet another embodiment, noise cancellation may be a software-driven process. Noise cancellation may cancel all identified undesirable traffic noises. Alternatively, noise cancellation may include a process of user selection of what types of noises to cancel. For example, a user may select that distant honking be cancelled by noise cancellation, or that all undesirable traffic noises are cancelled. As a further example, a user may have access to a knob that allows the user to reduce or increase the amount of noise allowed to come through. Alternatively, noise cancellation may be a process conducted by artificial intelligence. Finally, noise cancellation may utilize a combination of the above techniques. Software-driven noise cancellation may be a process of active noise cancellation.

In at least one embodiment, generated audio reflects sufficient information from the identified undesirable traffic noises to inform users of relevant traffic conditions. The adaptive sound generation program 110A, 110B may increase relative volume of traffic noises that are considered to reflect high risk factors or set volume in proportion to a calculated risk level.

Then, at 210, the adaptive sound generation program 110A, 110B alerts a user of relevant traffic conditions. An alert may be an audio alert, a visual alert, or a tactile alert. Relevant traffic conditions may include conditions related to undesirable traffic noises or other conditions identified by additional input. For example, relevant traffic conditions related to undesirable traffic noises may include a vehicle changing lanes, a vehicle skidding, or an animal charging at or into the path of a user's vehicle. Other conditions may include, for example, adverse weather conditions, a traffic accident further up the road, or low air in a vehicle's tires.

An audio alert may include the generated sounds, new audio, or uncancelled audio. New audio may include, for example, a warning sound or human voice designed to alert users of one or more relevant traffic conditions. If the adaptive sound generation program 110A, 110B utilizes a process of noise cancellation, uncancelled audio may be audio that would otherwise be cancelled, but is not cancelled so that it can serve as an alert. Alternatively, uncancelled audio may be amplified. For example, if cancelled audio is reduced by 80%, uncancelled audio may be amplified by 20%. Amplification may include repeating a sound through speakers to increase the apparent volume of the sound. Alternatively, each sound may be subject to individualized noise reduction or amplification based on urgency or apparent risk.

A visual alert may include an alert displayed on a phone display, a vehicle's main display, a vehicle's dashboard display, or a transparent overlay or heads-up display on a windshield. A visual alert may, for example, utilize written language, symbols, or colors that indicate potential or imminent risk. More specifically, a display may show a red arrow pointing left to indicate that there is an imminent risk coming from the left side of the car. Alternatively, a display may alert a user about weather conditions using written text.

A tactile alert may include, for example, a vibration in a steering wheel, car seat, or cell phone. Alternatively, a tactile alert may include a change in a heated seat temperature or a massage function on a massaging car seat.

In at least one embodiment, the type of alert may be selected in light of captured audio, additional input, or a calculated level of risk. An alert in light of additional input may, for example, be a visual alert. A low-risk alert may, for example, be an audio alert, while a high-risk alert may be a visual alert. Alternatively, the type of alert may be selected in light of whether or not a traffic condition corresponds to identified undesirable traffic noises. For example, undesirable traffic noises may be reflected by audio alerts, whereas other alerts may be reflected by visual alerts.

In at least one embodiment, relevant traffic conditions may be selected in light of captured audio, additional input, or a calculated level of risk. For example, relevant traffic conditions may include conditions acquired from a weather API that are considered significant enough to warrant an alert. Alternatively, relevant traffic conditions may include conditions to have a calculated risk level beyond a certain threshold. Alternatively, relevant traffic conditions may correspond to conditions that are reflected in undesirable traffic noises.

It may be appreciated that FIG. 2 provides only an illustration of one implementation and does not imply any limitations with regard to how different embodiments may be implemented. Many modifications to the depicted environments may be made based on design and implementation requirements.

Figure 3:
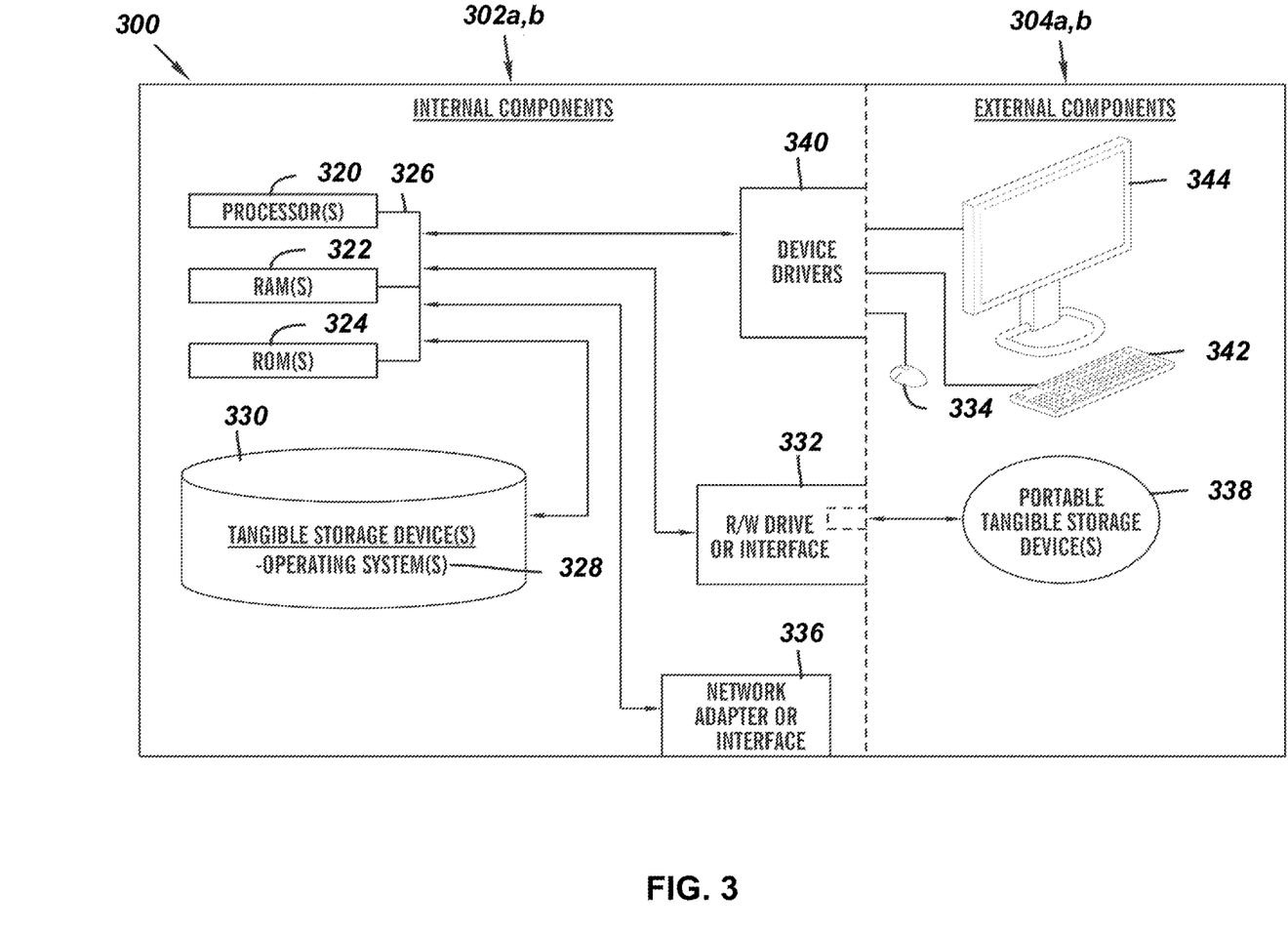
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the adaptive sound generation program 110A in the client computing device 102 and the adaptive sound generation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the adaptive sound generation program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the adaptive sound generation program 110A in the client computing device 102 and the adaptive sound generation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the adaptive sound generation program 110A in the client computing device 102 and the adaptive sound generation program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
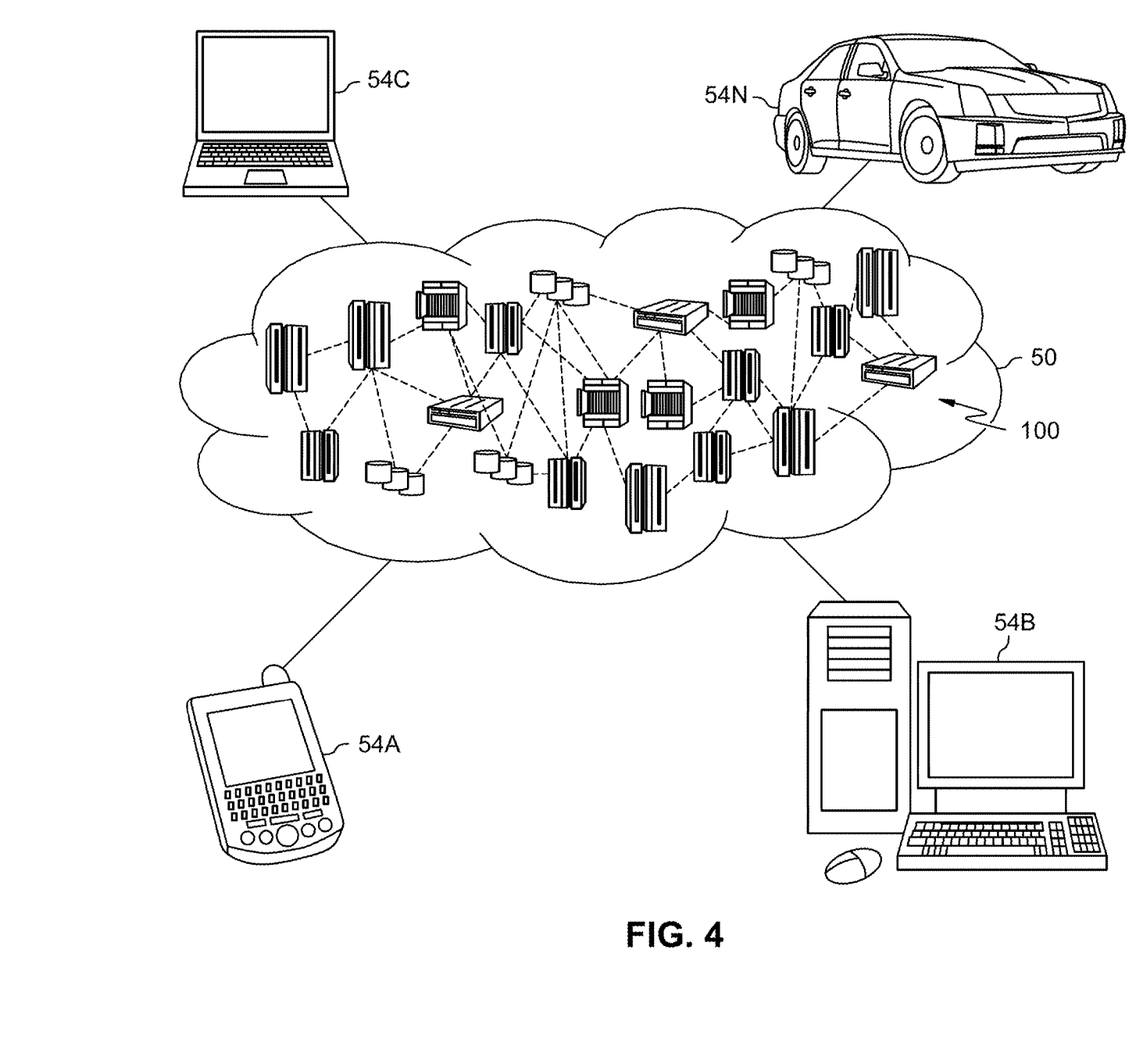
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
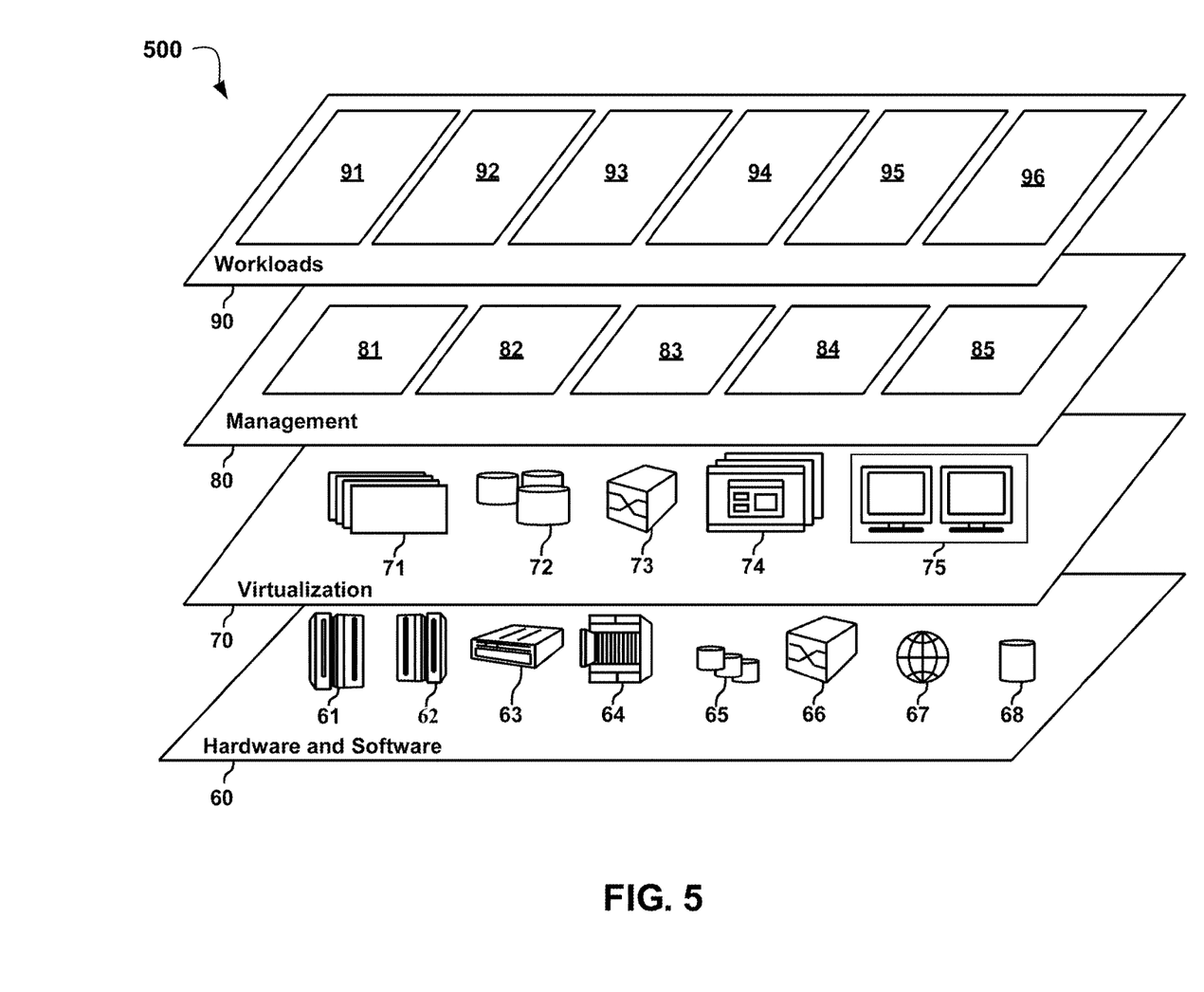
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive sound generation 96. Adaptive sound generation 96 may relate to generating sounds based on undesirable environmental noises to create a more amiable environment for the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

capturing audio input relating to traffic conditions or environmental conditions surrounding a user or a vehicle containing a user;

identifying a pattern and a volume of undesirable noises from within the captured audio;

performing a noise cancellation operation of the undesirable noises based on the pattern and the volume;

generating mood-improving sounds for a user based on converting the identified noises;

playing the generated sounds for the user over the noise cancellation operation;

calculating a risk score of new sounds captured, in real-time, through the audio input; and alerting the user or a second user of relevant traffic conditions or relevant environmental conditions including conditions that correspond to the identified noises based on the risk score satisfying a threshold, wherein the alerting is a reduction or removal of noise cancellation and an amplification of the audio input played in place of the mood-improving sounds.

2. The method of claim 1, wherein the generated mood-improving sounds comprise music or are based on music.

3. The method of claim 1, wherein the alerting includes providing visual alerts.

4. The method of claim 1, further comprising:
capturing additional input from one or more nearby devices obtained via a network connection.

5. A computer system, the computer system comprising:
one or more processors, one or more computer-readable memories, one or more computer-readable tangible non-transitory storage media, and program instructions stored on at least one of the one or more tangible non-transitory storage media for execution by at least one of the one or more processors via at least one of the one or more memories, wherein the computer system is capable of performing a method comprising:

capturing audio input relating to traffic conditions or environmental conditions surrounding a user or a vehicle containing a user;

identifying a pattern and a volume of undesirable noises from within the captured audio;

performing a noise cancellation operation of the undesirable noises based on the pattern and the volume;

generating mood-improving sounds for a user based on converting the identified noises;

playing the generated sounds for the user over the noise cancellation operation;

calculating a risk score of new sounds captured, in real-time, through the audio input; and alerting the user or a second user of relevant traffic conditions or relevant environmental conditions including conditions that correspond to the identified noises based on the risk score satisfying a threshold, wherein the alerting is a reduction or removal of noise cancellation and an amplification of the audio input played in place of the mood-improving sounds.

6. The computer system of claim 5, wherein the generated mood-improving sounds comprise music or are based on music.

7. The computer system of claim 5, wherein the alerting includes providing visual alerts.

8. The computer system of claim 5, further comprising:
capturing additional input from one or more nearby devices obtained via a network connection.

9. A computer program product, the computer program product comprising:
one or more computer-readable tangible non-transitory storage media and program instructions stored on at least one of the one or more tangible tangible non-transitory storage media, the program instructions executable by a processor capable of performing a method, the method comprising:

identifying a pattern and a volume of undesirable noises from within the captured audio;

performing a noise cancellation operation of the undesirable noises based on the pattern and the volume;

generating mood-improving sounds for a user based on converting the identified noises;

playing the generated sounds for the user over the noise cancellation operation;

calculating a risk score of new sounds captured, in real-time, through the audio input; and alerting the user or a second user of relevant traffic conditions or relevant environmental conditions including conditions that correspond to the identified noises based on the risk score satisfying a threshold, wherein the alerting is a reduction or removal of noise cancellation and an amplification of the audio input played in place of the mood-improving sounds.

10. The computer program product of claim 9, wherein the generated mood-improving sounds comprise music or are based on music.

11. The computer program product of claim 9, wherein the alerting includes providing visual alerts.

* * * * *